Oct. 31, 1939.   A. KAISER   2,177,892
SEAT
Filed Aug. 8, 1936   2 Sheets-Sheet 2
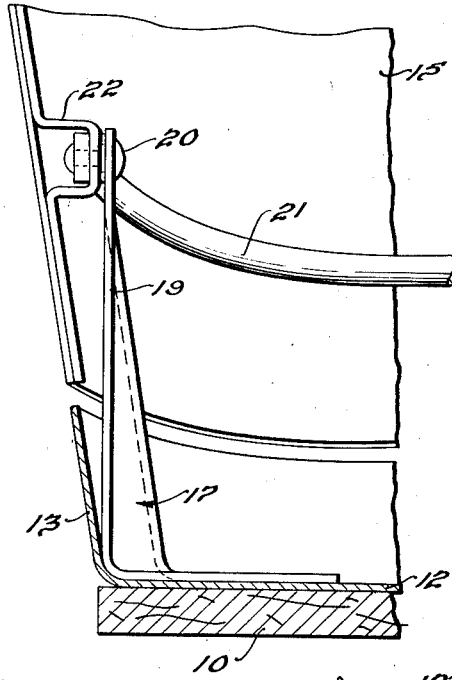
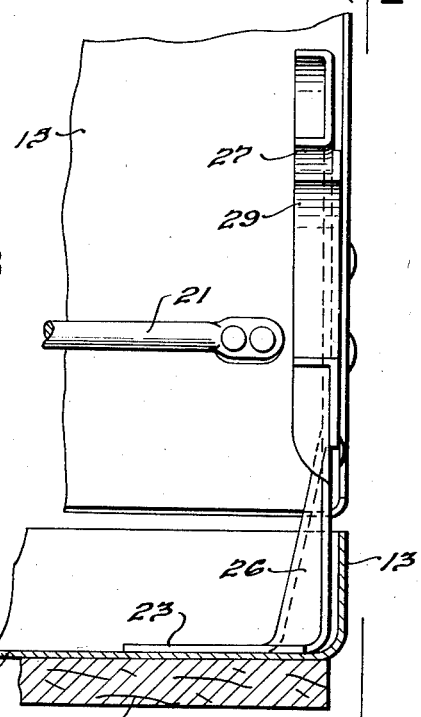
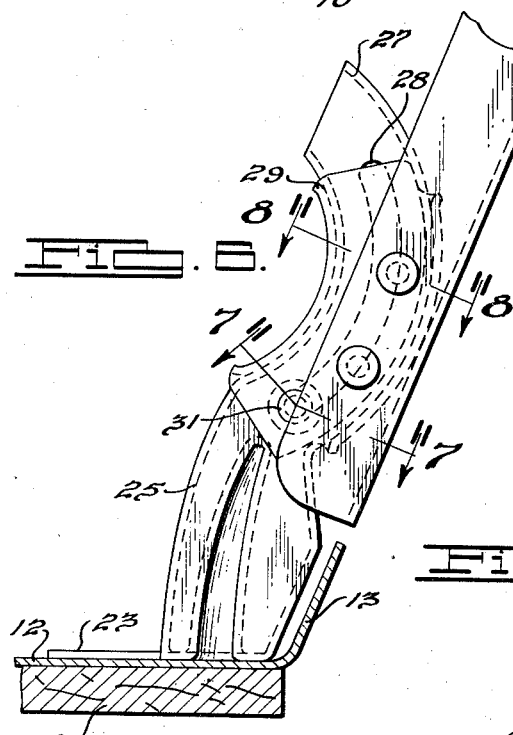
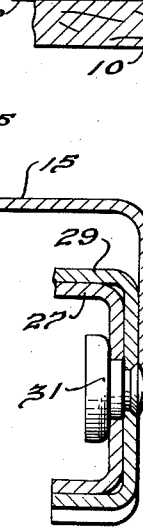
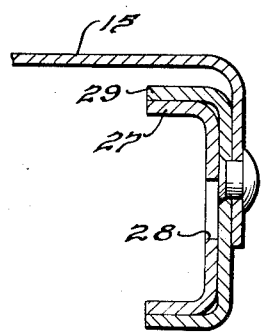
INVENTOR
AUGUST KAISER
BY Harness, Dind, Palee & Harris
ATTORNEYS.

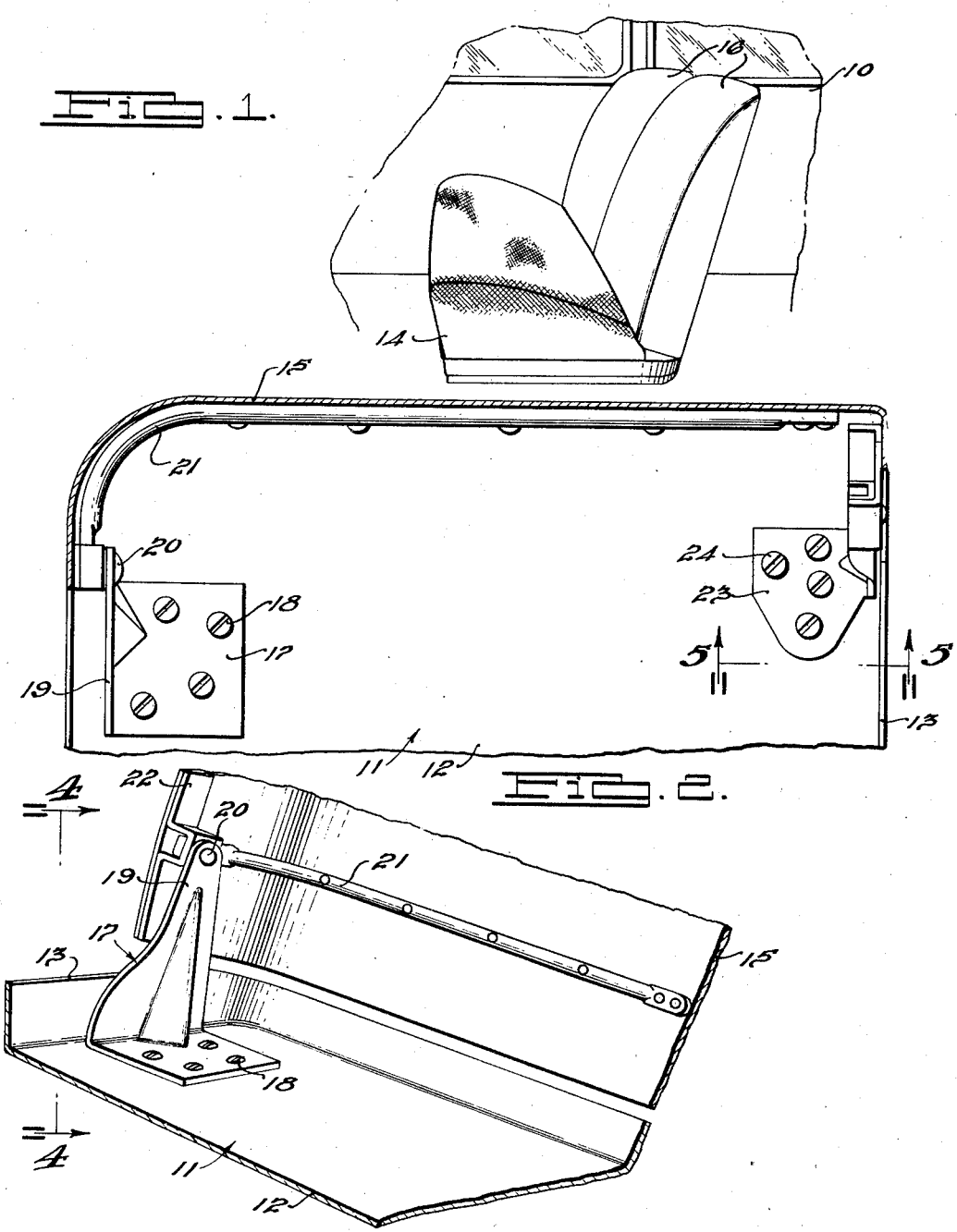

Patented Oct. 31, 1939

2,177,892

UNITED STATES PATENT OFFICE 2,177,892

SEAT

August Kaiser, Ferndale, Mich., assignor to Chrysler Corporation, Highland Park, Mich., a corporation of Delaware Application August 8, 1936, Serial No. 94,958

4 Claims. (Cl. 155—5)

This invention relates to a seat and more particularly to improved means for mounting a seat back.

One of the objects of the invention is to provide improved means for pivotally supporting a seat back.

The invention is particularly adapted for use in connection with seat structures including a single seat cushion and a pair of independently movable seat backs. Seat structures of this type are advantageously used in vehicle bodies of the two door sedan type wherein it is necessary to fold or rotate the seat back for the front passenger compartment forwardly to permit ingress and egress of passengers to and from the rearwardly disposed seating compartment.

The front passenger compartment of vehicles of the above type are frequently designed to accommodate three occupants in which case the independently rotatable seat backs should present a smooth, uninterrupted surface, especially at the adjacent or abutting edges of the seat backs, this being the space occupied by one of the three passengers. Where the seat back mountings are disposed within the contour of the seat cushion this space is interrupted with the result that considerable discomfort is caused to the passenger when the vehicle is subjected to road shocks. Heretofore where the mounting means for the seat back have been removed from the seat cushion contour it has been necessary to interrupt the contour of the seat cushion by the provision of a notched or offset portion to accommodate rotation of the seat back.

Another object of this invention is to overcome the aforesaid difficulties by so mounting the seat back that it moves in an arcuate path about an axis spaced from the seat back rest and disposed within the contour of the seat cushion, and more particularly to so dispose the mounting means for the seat back rest that there is no interference with the seating compartment and the rest is free for rotative movement with respect to the seat cushion.

Further objects of the invention are to provide a support for the inner edge portion of the seat back rest which can be disposed rearwardly of the front of the cushion thereof to guard against abutment of the passenger engaging portion of the cushion with the mounting; and to provide a mounting of this character which establishes the axis of rotation of the seat back rest at a location substantially in advance of the location of the structure of the mounting.

The above being among the objects of the present invention the same consists in certain novel features of construction and combination of parts to be hereinafter described with reference to the accompanying drawings and claims, having the above and other objects in view.

An illustrative embodiment of the invention is shown in the accompanying drawings, in which:

Fig. 1 is a fragmentary perspective view of a vehicle body showing a seat structure embodying the invention.

Fig. 2 is a horizontal sectional view of the frame structure of one of the seat backs shown in Fig. 1 and illustrating the invention.

Fig. 3 is a fragmentary substantially three-quarter front perspective view of the seat structure showing one of the seat back mounting members of a seat mounting embodying the invention.

Fig. 4 is a fragmentary vertical sectional view taken on line 4—4 of Fig. 3.

Fig. 5 is a fragmentary vertical sectional view taken on line 5—5 of Fig. 2.

Fig. 6 is a fragmentary side elevational view, partly in section, as indicated by the arrows 6—6 in Fig. 5.

Fig. 7 is a transverse sectional view taken on the line 7—7 of Fig. 6.

Fig. 8 is a transverse sectional view taken on the line 8—8 of Fig. 6.

Referring to the drawings, I have shown a fragmentary portion of a vehicle body 10 having a seat frame structure mounted upon the floor thereof. This structure includes a rectangularly shaped lower frame member or pan 11 extending transversely of the vehicle body and terminating adjacent the longitudinal edges thereof. The seat pan 11 preferably comprises sheet metal and has a flat base 12 and an upwardly extending flange 13 at three sides thereof forming a compartment for the reception of a seat cushion 14 supported therein. Seat back frame members 15 having forwardly extending side portions are independently and rotatably supported on the seat pan structure as will be hereinafter described. Each of the backs 15 preferably comprises sheet metal and has a seat back cushion or rest 16 disposed between its spaced side members. Inasmuch as the backs 15 are mounted for rotation relative to the supporting base in the same manner, it is necessary to include herein a description of the mounting means for only one such back.

A mounting bracket 17 is secured by screws 18 or other suitable means to the base 12 of the seat pan 11 and disposed adjacent one of the outer ends thereof and substantially midway between its longitudinal edges, as shown in Fig. 3. This bracket has a vertical portion 19, the upper extremity of which is provided with an aperture for receiving a pin 20 which also projects through a registering aperture in a metallic brace 21 secured to and extending across the seat back frame 15 and the forwardly extending side member thereof. The brace 21 terminates at the forward edge of the side member, as viewed in Fig. 3, and conforms to the curvature of the seat back frame. A channel shaped bracket 22 is secured to the front edge portion of the forwardly extending side of the seat back frame 15 and is provided with an aperture in which the pin 20 is also disposed. This construction forms one pivotal support member for the seat back frame 15 on the base 12 and determines one locating point for the axis about which the seat back rotates.

A second mounting bracket 23 is secured by screws 24 to the base 12 of the seat pan 11 adjacent the inner edge of the back frame 15 and is disposed rearwardly of the bracket 17, as shown in Fig. 2. The bracket 23 has a vertical support 25 provided with a stiffening rib 26. The upper portion 27 of the support 25 is arcuately formed and channel shaped in cross section, as shown in Figs. 7 and 8, and it has an arcuately extending slot 28 formed therein. A channel shaped mounting member 29 is secured by rivets to the adjacent forwardly extending side portion of the seat back frame 15, this member being arcuately shaped to correspond with the portion 27 of the bracket 23 with which it cooperates in pivotally supporting the back. In assembled position, the channel shaped member 27 is nested within the channel mounting member 29 and a pin 31, fixed to and carried by the member 29 moves within the slot 28 as the seat back 15 is rotated relative to the frame structure. The arcuate portion 27 of the mounting bracket 23 and arcuate member 29 provide the other locating point for determining the axis of rotation of the seat back 15 and in this case the structure of the mounting is disposed substantially rearwardly of the axis locating point established thereby.

The mountings for the seat back or backs 15 above described are disposed outside of the contour of the seat cushion 14, the mountings comprising the brackets 17 at the respective longitudinal edges of the frame structure, with respect to the vehicle body, being disposed beyond the respective ends of the cushion 14, while the mountings comprising the brackets 23 are rearwardly disposed with respect to the cushion 14, and relative movement between the cooperating channel shaped members 27 and 29 is about but not on the axis of rotation established by the mounting means.

By the arrangement of the mounting means heretofore described the seat backs are pivotally supported by mountings disposed outside of the contour of the seat cushion, yet they provide an axis of rotation for the seat backs which passes through the cushion, thus avoiding contact of the passenger engaging portion of the seat back cushion with the structure of the mounting when this cushion is compressed. This structure facilitates the provision of a continuous seat back cushion surface in which there are no hard spots to interfere with passenger comfort, especially where there are three passengers in this compartment. Furthermore, there are no interruptions in the seat cushion contour to accommodate rotation of the seat back and the seat structure presents a neat and trim appearance as illustrated in the finished form in Fig. 1. The arrangement permits concealment of the hinge joint by the seat cushion in cooperation with the back rest cushion.

Although but one specific embodiment of the invention is herein shown and described, it will be understood that various changes in the size, shape and arrangement of parts may be made without departing from the spirit of my invention, and it is not my intention to limit its scope other than by the terms of the appended claims.

What I claim is:

1. In combination, a seat cushion and a relatively movable back rest, means for supporting said back rest and to permit pivotal movement thereof about an axis passing through said seat cushion, said means including transversely spaced hinge joints disposed outside the contour of said seat cushion, one of said joints being disposed on said axis of rotation adjacent an end portion of said seat cushion and the other of said joints being disposed intermediate the ends thereof, said last named joint being displaced from the axis of rotation of said back rest.

2. In combination, a seat cushion and a relatively movable back rest, means for supporting said back rest and to permit pivotal movement thereof about an axis passing through said seat cushion, said means including transversely spaced hinge joints disposed outside the contour of said seat cushion, one of said joints being disposed adjacent an end portion of said seat cushion and the other of said joints being disposed intermediate the ends thereof, said last named joint being displaced from the axis of rotation of said back rest and comprising interengaging elements adapted for relative movement in an arcuate path with respect to the axis of rotation of said back rest.

3. In a seat structure including a seat cushion and a relatively movable back rest, means including spaced mounting units disposed adjacent said cushion and outside the contour thereof for supporting said back rest for pivotal movement about a horizontal axis forwardly of the rear edge of said cushion, one of said units being disposed on the axis of rotation of said back rest and adjacent an end portion of said seat cushion and the other of said units being displaced from said axis of rotation and disposed intermediate the ends of said cushion, said last named unit comprising arcuately shaped interengaged elements secured one to said back rest and one to a fixed member of said seat structure, one of said elements being channel-shaped in cross section for receiving the other of said elements, and means for maintaining said elements against relative separation.

4. In a seat structure including a seat cushion and a relatively movable back rest comprising a frame structure having flanged opposite side portions extending forwardly with respect to said cushion and a back rest cushion disposed between said flanges, means including spaced mounting units for supporting said back rest for pivotal movement about a horizontal axis located between the vertical planes of the front and rear extremities of said cushion, one of said units being disposed on the axis of rotation of said back rest and the other of said units being displaced from said axis of rotation, said first mentioned unit including a fixed element and an element movable relative to the latter carried by the adjacent flanged portion of said back rest, said last named unit comprising interengaging elements, means connecting said elements for relative movement in an arcuate path about said axis of rotation, one of said last mentioned elements being secured to a fixed member of said seat structure and the other being rigid with the other flanged portion of said back rest, said back rest cushion and said seat cushion cooperating to conceal said mounting units.

AUGUST KAISER.